United States Patent [19]

Tauber

[11] 4,199,443

[45] Apr. 22, 1980

[54] OIL MONITORING APPARATUS

[76] Inventor: Thomas E. Tauber, 24 E. Glenolden Ave., Glenolden, Pa. 19036

[21] Appl. No.: 910,495

[22] Filed: May 30, 1978

[51] Int. Cl.² .......................................... B01D 35/14
[52] U.S. Cl. .................................... 210/85; 210/304; 210/512 R
[58] Field of Search ................ 210/85, 304, 234, 168, 210/512, 235

[56] References Cited

U.S. PATENT DOCUMENTS

| | | | |
|---|---|---|---|
| 1,176,732 | 3/1916 | Bowser | 210/304 |
| 2,349,992 | 5/1944 | Schrader | 210/85 |
| 2,429,920 | 10/1947 | Bourne, Jr. | 210/85 X |
| 2,544,244 | 3/1951 | Vokes | 210/304 |
| 2,936,890 | 5/1960 | Botsiber | 210/85 X |
| 3,067,876 | 12/1962 | Hruby, Jr. | 210/304 X |
| 3,127,255 | 3/1964 | Winslow | 210/304 |
| 3,628,662 | 12/1971 | Kudlaty | 210/234 |
| 3,686,926 | 8/1972 | Miller et al. | 210/85 |
| 3,878,103 | 4/1975 | Miller et al. | 210/85 |
| 4,077,876 | 3/1978 | Southall | 210/235 |

*Primary Examiner*—Theodore A. Granger
*Attorney, Agent, or Firm*—Robert S. Lipton; Arthur E. Oaks

[57] ABSTRACT

An apparatus and method for selectively detecting particles above a predetermined size in oil lubrication systems, is disclosed. The oil tangentially enters a cylindrical chamber, whereby rotary motion is imparted to it. A detection cavity is positioned in the outer cylinder at its periphery. Heavier particles which are used by the apparatus to detect failures are transported into the cavity by centrifugal force while lighter particles remain suspended in the oil. A sensor is contained within the cavity to detect the heavier failure particles. A filter is combined with the apparatus for removing the lighter wear particles which would otherwise remain suspended in the oil. In another embodiment a self closing valve enables the filter to be removed from the system without requiring the oil to be drained.

5 Claims, 2 Drawing Figures

OIL MONITORING APPARATUS

BACKGROUND OF THE INVENTION

This invention relates generally to particle separators and detectors which are used in conjunction with lubrication systems for mechanical equipment which utilize a fluid such as oil. In particular, the invention selectively discriminates particles above a predetermined size in the oil of lubrication systems. It also includes a filter contained within the apparatus to selectively retain particles. A self closing valve may be combined with the filter so it may be removed without the requirement that the oil be drained.

Mechanical power transmission equipment is subject to wear due to friction, caused by the contact of moving parts under pressure at high relative speeds. This results in an abrasive wearing of the surface with the resulting release of small particles. Such "wear particles" are generally less than 20 microns in size. Particles of this size are suspended in the oil and generally move with it rather than reacting promptly to gravity and inertial forces. Once such particles are suspended in the oil they act as abrasives, thus reducing the lubrication effect of the oil. Such particles are generally removed from the oil through the use of filters which are introduced into the system, or by magnets which may be used if the particles are of ferrous nature.

When the components of the power transmitting system which is being lubricated become overloaded or when localized areas of weakness occur, particles of material become loosened, generally at the point of contact between moving parts under high surface pressure. Once the surface has been deformed by the breaking off of such particles the rate of deterioration is accelerated resulting in the breaking off of additional particles at an increasing rate. These "failure particles" are generally of a much greater order of magnitude in size than the previously referred to "wear particles". Additionally, the quantities of wear particles produced are substantially increased. Failure particles generally fall into the 100 to 2000 micron size range. Due to their greater mass they are less subject to being suspended in the lubricating fluid.

It is well known that the structural failure of drive train components may be predicted in advance of such failure by monitoring the condition of the lubricating oil. Such structural failure is indicated when metallic particles in the size range of failure particles are detected, i.e. greater than 100 microns, or when the quantity of wear particles substantially increases. The present invention is of the type that detects failure particles.

The prior art is replete with descriptions of various apparatus which will detect the presence of failure particles. Some of these apparatus use filters of varying mesh size which are periodically checked so as to determine the presence of wear particles. This approach is not appropriate for aircraft applications as it does not lend itself to in-flight monitoring. Other apparatus use electronic devices wherein wear particles are detected by the disturbance of a magnetic or electric field by wear particles. A problem associated with such apparatus has been that an accumulation of wear particles may produce the same signal as a failure particle thus resulting in a false indication. Additionally, such magnetic detectors are highly dependent upon the sensor which is used in determining the overall accuracy and sufficiency of the apparatus. U.S. Pat. Nos. 2,936,890 issued May 17, 1960 and 3,432,750 issued Mar. 11, 1969 to Botstiber are examples of magnetic chip detectors. U.S. Pat. No. 3,317,042 issued May 2, 1967 to Botstiber is an example of an apparatus which combines a filter with a circuit completion type sensor.

As previously indicated, most lubricating systems contain filters for removing particles. Of course, such filters require periodic replacement. Various mechanisms are disclosed in the prior art for replacing such filters without requiring that the lubricating fluid in the system be drained.

The various apparatus and structure required for detecting wear particles, filtering the lubrication fluid, and enabling filters to be changed without draining the system increase the weight and complexity of such systems. This weight and complexity is particularly undesirable and detrimental for aircraft applications.

SUMMARY OF THE INVENTION

The present invention hydraulically segregates failure particles from wear particles thus increasing the reliability and accuracy of the detection of the failure particles by conventional detection equipment. The invention may be adapted so as to include means for removing a filter contained within the system for removing wear particles, without requiring that the system be drained.

The invention includes a guiding cylinder which is encompassed and connected to an outer cylindrical housing. The guiding cylinder depends from the top of the housing but does not extend to the bottom of the housing. The lubricating fluid enters the top of the housing tangentially and flows in a vortex to the bottom of the housing. It then rises within the center of the vortex to the top of the guiding cylinder where it exits the housing. A detection cavity is formed at the bottom of the housing at or near its periphery for receiving failure particles. Normal wear particles, which are suspended in the fluid travel along with it. The heavier failure particles are forced against the inner surface of the housing by centrifugal force and are thrust into the detection cavity. Particle detection equipment is contained within the cavity thus indicating the presence of the subject failure particles. A filter may be positioned within the guiding cylinder for capturing wear particles. A self-closing valve, adapted to hold the filter, may be incorporated into the housing so that the filter may be changed without draining the system.

Accordingly, it is the object of the present invention to provide an apparatus which will cyclonicly separate failure particles from wear particles in the fluid of a lubricating system for mechanical drive systems.

It is another object of the present invention to provide means for cyclonicly separating failure particles from wear particles in the fluid of lubrication systems, wherein centrifugal force is used to provide such mechanical separation.

It is still another object of the present invention to provide means for separating failure particles from wear particles in the fluid of lubrication system and which includes a filter for removing wear particles from the fluid.

It is still an additional subject of the present invention to provide means for separating failure particles from wear particles in a lubrication system and which includes means for removing a filter contained therein without the requirement that the system be drained of fluid.

It is still an additional object of the present invention to provide means for separating failure particles from wear particles using a cyclonic separator in a lubrication system which includes a filter for removing wear particles wherein said filter may be removed without the requirement that the system be drained of fluid.

DESCRIPTION OF THE DRAWINGS

The construction of the preferred embodiment as well as further objects and advantages of the invention will become further apparent from the following specification when considered with the accompanying drawings in which like numerals refer to like parts wherein.

DESCRIPTION OF THE PREFERRED EMBODIMENT

Figures 1, 2:
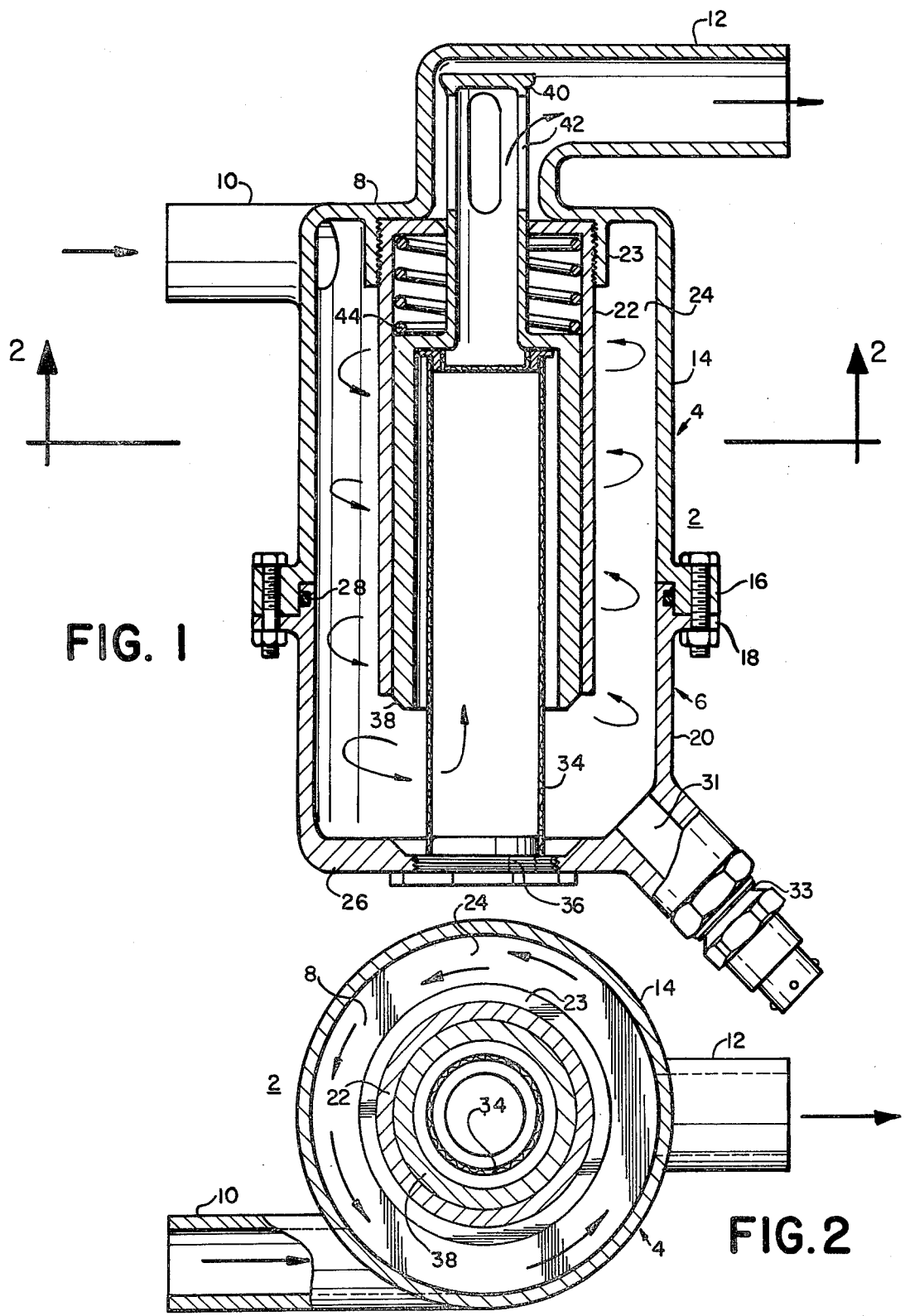
FIG. 1 is a side elevation view partially broken away showing a cross section of an embodiment of the present invention.
FIG. 2 is a cross sectional view taken along line 2—2 in FIG. 1.

Reference will now be made to FIGS. 1 and 2 which illustrate the invention. In the preferred embodiment the housing 2 is divided into two separate portions, an upper portion 4 and a lower portion 6 which are connected so as to form the basic structure herein described. The upper portion 4 comprises a head portion 8 which contains a fluid inlet 10 and a fluid outlet 12. The unit is inserted, generally, into a fluid hydraulic system (not shown) such as a lubrication oil line of an engine. Attached to head portion 8 and extending down from it is a cylinder 14 with which it cooperates to form the external structure of upper portion 4. In the final construction this becomes the top and upper side of body 2. At the opposite end of cylinder 14 is a flange 16 which is machined to accept and seal the mating flange 18 of a lower hollow cylinder 20.

Also attached to the interior of head 8 is a hollow sleeve 22 or guide cylinder which leads into outlet 12. The cylinder 22 is connected by any suitable means and is shown threadably engaged to an annular member 23 of the head 8. The sleeve, which extends partially down the length of body 2, is substantially concentric with cylinders 14 and 20 so that there is a circular annular area 24 between the cylinder and the sleeve. The sleeve or guide cylinder 22 itself is open at the bottom and serves as a conduit to pass the fluid from the annular area 24 to the outlet 12 for discharge back into the system.

The lower portion 6 of the housing 2 includes the hollow cylinder 20 and a bottom portion 26. The upper portion 4 and the lower portion 6 are sealed by an "O" ring 28 made of a suitable inert material such as silicone rubber. The two portions 4 and 6 are held together with a plurality of bolts 30 which connect flanges 16 and flanges 18. It should be noted that the inner surfaces of the upper and lower cylinder portions 4 and 6 are smooth and mate to form an unrestricted inner wall for the housing. At the opposite end of lower cylinder 20 is bottom 26 which acts to close body 10 for containment of the fluid being treated.

A cavity 31 is required for the collection of the wear particles. It may be formed as an integral part of the lower portion 6 of the housing 2 or it may be formed in a separate member which is connected to the housing. For reasons which will be subsequently explained, it is important that the opening to the cavity be positioned or at near the periphery of the bottom 26 of the lower portion 6 of the housing 2. In the preferred embodiment of the invention shown in FIG. 1 the cavity 31 is shown formed as an integral part of the lower portion 6. In the preferred embodiment the longitudinal axis of the cavity is positioned at a forty-five degree angle to the longitudinal axis of the housing. For some applications this is preferrable due to various factors, e.g. efficiency or space constraints. Other angular orientations of the cavity may be selected so long as the opening of the cavity is at or near the periphery of the bottom 26 and so that particles travelling parallel to the surface of the bottom 26 may enter the cavity 31. A sensor 33 is inserted into the cavity for detecting wear particles which are collected there. Any one of a variety of sensors may be used for sensor 33. However, a sensor of the magnetic type is contemplated for the preferred embodiment. The sensor 33 is shown threadably engaging the portion of the housing in which the cavity 31 is formed.

System operation will now be described with reference to FIG. 1. It has been noted that upper cylinder 14 and sleeve 22 cooperate to form a concentric annulus. Inlet 10 is positioned to inject the fluid into the annulus tangential to the inner diameter of cylinder 14. This in combination with downward extension of the sleeve 22 forces the fluid so injected into a downward cyclonic spiral in annulus 24 until it reaches the bottom of sleeve 22. Centrifugal force causes the wear particles to travel outward to the housing wall where they are forced into the cavity 31 and detected by sensor 33. In the spiraling flow path so established, the velocity of any unit volume of fluid will tend to be proportional to the radius of the particular circular flow pattern it is following. Thus there will tend to be a velocity gradient across the annular cyclonic flow path of the fluid. Of course any particles suspended within that particular unit volume of fluid will also be travelling at essentially the same velocity.

As used herein "down" means a direction along the axis of rotation of the spiraling fluid, away from the fluid inlet.

The cyclonic separator of the present invention may include a filter for removing the wear particles. This is accomplished by positioning a filter 34 within the sleeve 22 so that it abuts the bottom 26 of the housing 2. In this manner all the oil which passes from the annular area 24 to the outlet 12 must pass through the filter 34. Means may be provided for removing the filter from the housing, without requiring that the housing be disassembled. This is accomplished through a plug 36 which threadably engages the bottom 26.

The present invention includes a self-closing valve assembly which eliminates the need for draining the system whenever the filter requires changing. The valve assembly includes a filter housing 38 which slidably engages the sleeve 22. Filter 34 is connected to the upper portion of the filter housing 38. The lower portion of the filter housing 38 forms part of the valve apparatus when it seats against a mating portion of the bottom 26 of the housing 2. An upper portion of valve assembly 40 is connected to the filter housing 38. The upper portion 40 has a plurality of orifices 42 in its upper portion. The top of the valve assembly 40 is formed so as to mate with the upper portion of the sleeve 22. A spring 44 is positioned between the sleeve 22 and the filter housing 38.

When it is desired to change the filter 34 the plug 36 is disengaged allowing the filter housing 38 to drop until it abuts and seals against the bottom 26. Of course, as the filter housing 38 drops so does the upper portion of the valve 40 which mates with the sleeve 22. As a result a small amount of oil is lost during the time required for the assembly to drop. The entire valve assembly is maintained in a closed position by the spring 42. While in the closed position the filter 38 may be changed. When a new filter is inserted the entire assembly is physically raised, thereby compressing the spring, and maintained in place by the plug 36. While the valve is in the closed position oil which is in the outlet 12 cannot drop into the housing 2 nor can oil which is contained in the annulus 24 pass into the sleeve 22.

Although the present invention has been described with reference to the particular embodiment herein set forth, it is understood that the present disclosure has been made only by way of example and that numerous changes in the details of construction may be resorted to without departing from the spirit and scope of the invention. Thus, the scope of the invention should not be limited by the foregoing specification, but rather only by the scope of the claims appended hereto.

What is claimed is:

1. In a fluid lubrication system for mechanical drives, a particle separator for separating failure particles from wear particles which comprises:

means for cyclonicly separating heavier failure particles from lighter wear particles contained in the fluid which includes a closed cylindrical housing forming a chamber having a smooth inner wall, a top and a bottom, a fluid inlet adapted to tangentially inject the fluid into said housing, a fluid outlet from said housing, and a hollow open bottomed cylindrical sleeve concentric with and depending from the top of said housing and spaced apart from the bottom of said housing, said sleeve adapted to receive the treated fluid and conduct it to said outlet and further adapted to cooperate with said inlet such that when the fluid is tangentially injected into an annulus formed between the inner wall of said housing and the outer wall of said sleeve a downwardly spiraling cyclonic flow pattern is developed, said flow pattern generating a centrifugal force field which selectively propels failure particles out of the flow pattern for subsequent capture;

means adapted to receive the separated failure particles;

indication means connected to said receiving means for indicating the presence of failure particles, and a cylindrical filter means adapted to remove the wear particles from the fluid stream being treated, said filter having its upper end connected to the lower end of said sleeve and its lower end abutting the bottom of said chamber of said housing.

2. The apparatus of claim 1 wherein said receiving means comprises a cavity of said housing which acts to trap the failure particles, said receiving means containing a sensor positioned in said cavity which is adapted to signal the presence of trapped particles.

3. The apparatus of claim 2 wherein said separation means further includes a self-closing valve means located within and adapted to slide up and down within said sleeve said valve being further adapted, when in the down position, to close off both the fluid inlet and outlet to the housing.

4. The apparatus of claim 3 wherein the filter means is connected to said valve means so as to hold said valve means in the up position to open up both the fluid inlet and outlet to the housing.

5. The apparatus of claim 4 wherein the bottom portion of said housing comprises a removable plug adapted to support the filter thereby permitting easy removal of said filter for cleaning or replacement and permitting said plug to cooperate with said filter and said valve so that when said plug and filter are in place said valve will be open.

* * * * *